Dec. 15, 1931.  H. V. REED  1,837,173
CLUTCH PLATE
Filed March 7, 1929
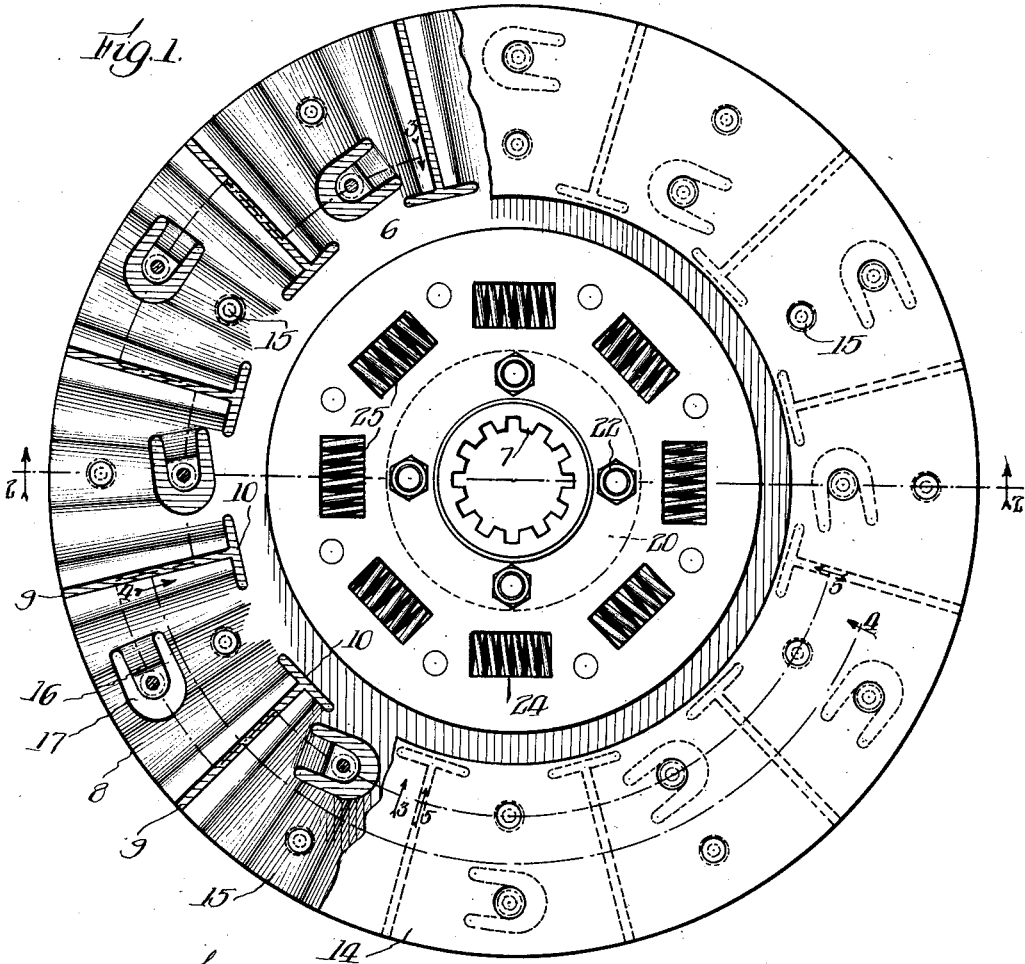

Patented Dec. 15, 1931

1,837,173

UNITED STATES PATENT OFFICE

HAROLD V. REED, OF CHICAGO, ILLINOIS, ASSIGNOR TO THE BORG & BECK COMPANY, OF CHICAGO, ILLINOIS, A CORPORATION OF ILLINOIS

CLUTCH PLATE

Application filed March 7, 1929. Serial No. 345,143.

This invention relates to friction clutches of the kind wherein a friction plate driven member is interposed between two parts of a driving member and is adapted to be gripped or clamped by the parts under sufficient pressure to impart motion from the driving member to the driven member of the clutch. The invention is particularly desirable in a friction clutch for automotive vehicles.

The object of the invention is to provide a novel clutch plate having friction rings which will take hold smoothly and evenly throughout the contact area when pressure is initially applied and by a yielding but rapid progressive action make the clutch act quickly and efficiently without grabbing or jerking.

Another object of the invention is to provide a clutch plate with continuous friction rings and to make full engagement between the friction rings and the driving member throughout the application of pressure, whereby to secure maximum efficiency in a rapid progressive movement and without uneven wear on the rings.

And a further object of the invention is to provide a clutch plate with friction rings mounted in a novel manner, one being relatively fixed on one side of the plate and the other being yieldingly mounted on the other side of the plate and movable relatively to the fixed ring, the fastening means being located in adjacent relation to provide a desirable uniformity in assembly and to avoid any tendency that the rings may have to bulge or distort.

And a still further object of the invention is to provide a clutch plate which will yield gently and progressively under the application of pressure in closing the clutch to prevent grabbing or jerking or other irregularity in the frictional engagement and which will also absorb vibrations from the engine and prevent them from being transmitted through the clutch to the transmission.

In the accompanying drawings illustrating a selected embodiment of the invention Fig. 1 is a side elevation of the clutch plate showing one of the friction rings partly broken away.

Fig. 2 is a sectional view on the line 2—2 of Fig. 1.

Fig. 3 is a sectional view on the line 3—3 of Fig. 1.

Fig. 4 is a sectional view on the line 4—4 of Fig. 1.

Fig. 5 is a sectional view on the line 5—5 of Fig. 1.

Referring to the drawings the clutch plate comprises a disk 6 mounted on a hub 7. The disk is divided into a plurality of sectors 8 by radial slots 9 which extend through the periphery of the disk and connect at their inner ends with transverse slots 10 at or about the middle thereof. These slots 10 are provided to enable the side margins 11 of the sectors to be bent bodily and laterally to off-set position on one side of the disk. The central part 12 of the sector between the side margins 11, 11 remains in the plane of the disk and the portions 13 connecting the margins 11 with the central portions 12 are inclined to off-set the margins 11, Fig. 4. Each of the sectors is shaped as thus described, and as shown in Fig. 4 with its central portion located in the plane of the disk and its side margins off-set on the same side of the disk. A friction ring 14 is fastened by rivets 15 or other suitable fastening means to the central portion of each sector and this ring will lie flat against the sectors to which it is rigidly fastened. Tongues 16 are formed in the sectors by making horseshoe shaped cut-outs 17 in the sectors. These tongues are located alternately in the outer part of one sector and in the inner part of the next sector and they all extend annularly in the same direction. A friction ring 18 is fastened to these tongues by rivets 19 or other suitable fastening means. The tongues are bent outward but slightly less than the margins 11, 11 of the sectors to maintain a slight tension on the tongues at the rivets 19 to hold the ring 18 flat against the sectors and under slight tension. The friction rings are fastened to each of the sectors in or about a radial line, the ring 14 being rigidly fastened by the rivets 15 flat against the sectors on one side of the disk and the ring 18 being fastened by the rivets 19 to the tongues 16 adjacent their free ends. The ring 18 is yieldingly supported by the sector margins 11, 11 and by the tongues 16 in a position slightly off-set from the disk and it will yield gently and progressively under the application of pressure in closing the clutch. Both friction rings are supported throughout their width so that they will make contact over their entire area beginning with initial pressure. Any annular shift of the movable ring 18 will be bodily and will be accommodated by the tongues which will permit a limited annular shift in flattening out under pressure. The construction provides a uniformity of assembly and overcomes any tendency there may be for the friction rings to bulge or distort because each of the rings is fastened to each of the sectors and is thereby maintained as a whole in proper position and shape.

The side margins 11 of each sector are connected with the central portion by relatively wide bent or inclined connecting portions 13 which provide a soft yielding cushion for the movable friction ring 18 to produce a clutch which acts quickly but softly and avoids grabbing, jerking or other irregular clutch action.

The hub 7 has a peripheral flange 20 and side plates 21 are secured to this flange by bolts 22. The side plates overlap the disk 6 and filler plates 23 are arranged between the disk and the side plates. These filler plates may be loose or they may be fastened to the side plates or to the disk. The side plates, filler plates and disk are provided with alined openings 24 and coil springs 25 are arranged in these openings with the ends of the springs seated against the end walls of the openings. These springs form cushions between the friction member and the hub member of the clutch plate and absorb vibrations and other noises originating in the engine or in the clutch and prevent them from being transmitted to the transmission or other parts of the vehicle. My improved clutch plate provides a cushion effect under the application of pressure in closing the clutch and in the release of pressure in opening the clutch, and it also provides a cushion intermediate of the friction member and the hub member of the clutch plate whereby the clutch plate as a unit and by reason of its combined cushions operates not only to produce a clutch which will act quickly and softly but it will eliminate many noises and absorb many vibrations and noises and particularly period vibrations.

I have shown the invention in a simple form suitable for embodiment in an automotive clutch but I reserve the right to make all such changes in the form, construction and arrangement of parts as may be necessary or desirable to adapt the invention for other clutches, or for other purposes and within the scope of the following claims.

I claim:

1. A clutch plate comprising a disk embodying a plurality of sectors, all of said sectors having side margins offset on the same side of the disk, and friction rings disposed on each side of said disk connected to each of said sectors.

2. A clutch plate comprising a disk embodying a plurality of sectors having the side margins thereof offset on the same side of said disk, friction rings disposed on each side of said disk, and means for fastening said rings to said sectors.

3. A clutch plate embodying a plurality of sectors having tongues thereon, a friction ring on one side of said disk fastened to said sectors and a friction ring on the other side of said disk fastened to said tongues.

4. A clutch plate comprising a disk having a plurality of sectors, the side margins of all of said sectors being off-set on the same side of the disk, continuous friction rings arranged over said sectors on opposite sides of the disk, and fastening devices connecting each ring with the central portion of each sector.

5. A clutch plate comprising a disk having a plurality of sectors, the side margins of all of said sectors being off-set on the same side of said disk, the central portion of all of the sectors lying in the plane of the body of the disk, and the portions of each sector connecting the central portion with the side margins forming a relatively wide yielding connection supporting the margins in off-set relation to the body of the disk, continuous friction rings arranged over said sectors on opposite sides of the disk, and fastening devices connecting each ring with the central portion of each sector.

6. A clutch plate comprising a disk having a plurality of sectors, each sector having a tongue, a friction ring fastened on one side of said disk to said sectors, and another friction ring fastened on the other side of the disk to said tongues.

7. A clutch plate comprising a disk having a plurality of sectors, each sector having a tongue, continuous friction rings arranged on opposite sides of said disk over said sectors, means for fastening one friction ring to said tongues, and means fastening the other friction ring to said sectors, said fastening means being arranged in substantially radial lines on each sector.

8. A clutch plate comprising a disk having a plurality of sectors, the side margins of said sectors being off-set on one side of the disk, a friction ring fastened to the central portion of the sectors on one side of the disk, a tongue in each sector, and another friction ring supported on said off-set margins and fastened to said tongues.

9. A clutch plate comprising a disk having a plurality of sectors, a continuous friction ring arranged over said sectors on one side of the disk, the side margins of said sectors being off-set to support said ring, tongues on said sectors, and means fastening said ring to said tongues, said tongues being off-set slightly less than said margins so that they will be held slightly at tension at the fastening devices.

10. A clutch plate embodying a plurality of sectors, tongues on each of said sectors, the tongues on adjacent of said sectors being out of circumferential alignment with each other, a friction ring on one side of said disk fastened to said sectors, and a friction ring on the other side of said disk fastened to said tongues.

11. A clutch plate embodying a plurality of sectors, tongues on each of said sectors, the tongues on adjacent of said sectors being out of circumferential alignment with each other, the tongues on alternate of said sectors being circumferentially aligned with each other, and a friction ring on each side of said plate and fastened to said tongues.

HAROLD V. REED.